US010889133B2

(12) United States Patent
Jackson et al.

(10) Patent No.: US 10,889,133 B2
(45) Date of Patent: *Jan. 12, 2021

(54) DUAL PARTICLE INKJET PRINTER

(71) Applicant: Palo Alto Research Center Incorporated, Palo Alto, CA (US)

(72) Inventors: Warren B. Jackson, San Francisco, CA (US); Robert Street, Palo Alto, CA (US); Steven E. Ready, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,146

(22) Filed: Jul. 31, 2019

(65) Prior Publication Data

US 2019/0351682 A1 Nov. 21, 2019

Related U.S. Application Data

(63) Continuation of application No. 15/850,034, filed on Dec. 21, 2017, now Pat. No. 10,384,463.

(51) Int. Cl.
*B41J 11/00* (2006.01)
*B41J 2/415* (2006.01)
(Continued)

(52) U.S. Cl.
CPC ............. *B41J 11/002* (2013.01); *B41J 2/045* (2013.01); *B41J 2/135* (2013.01); *B41J 2/215* (2013.01); *B41J 2/415* (2013.01)

(58) Field of Classification Search
CPC ... B41J 2/415; B41J 2/135; B41J 2/045; B41J 2/215; B41J 2/14201; B41J 11/002; B33Y 70/00; B33Y 30/00; B22F 1/0074
See application file for complete search history.

(56) References Cited

U.S. PATENT DOCUMENTS 3,258,817 A 7/1966 Smiley
5,387,380 A 2/1995 Cima et al.
(Continued)

FOREIGN PATENT DOCUMENTS

EP 3144358 * 5/2015

OTHER PUBLICATIONS

Pan et al., "The Investigation of Gravity-Driven Metal Powder Flow in Coaxial Nozzle for Laser-Aided Direct Metal Deposition Process", Journal of Manufacturing Science and Engineering, vol. 128, May 2006, pp. 541-553.

*Primary Examiner* — Henok D Legesse
(74) *Attorney, Agent, or Firm* — Mueting Raasch Group

(57) ABSTRACT

A printing apparatus includes a liquid ejector configured to eject liquid droplets towards a medium. A particle delivery device is configured to deliver particles to the medium. The particles are configured to combine with at least some of the liquid droplets and change at least one property of the liquid droplets. The particle delivery device is configured to deliver the particles after or substantially simultaneously as the liquid droplets are ejected. A curing device is configured to cure the combination of the liquid droplets and the particles onto the medium. A controller is configured to independently control the liquid ejector and the particle delivery device.

20 Claims, 11 Drawing Sheets

(51) Int. Cl.
*B41J 2/135* (2006.01)
*B41J 2/045* (2006.01)
*B41J 2/215* (2006.01)

(56) References Cited

U.S. PATENT DOCUMENTS

| | | | |
|---|---|---|---|
| 6,155,666 | A | 12/2000 | Sugimoto et al. |
| 6,502,912 | B1* | 1/2003 | Bernard .................. B41J 3/546 |
| | | | 235/491 |
| 6,746,114 | B2 | 6/2004 | Takahashi et al. |
| 10,384,463 | B2* | 8/2019 | Jackson ................. B33Y 70/00 |
| 2004/0101619 | A1* | 5/2004 | Camorani ............. B05B 7/1495 |
| | | | 427/180 |
| 2007/0076069 | A1* | 4/2007 | Edwards ................ B41J 2/2114 |
| | | | 347/100 |
| 2012/0269983 | A1 | 10/2012 | Grinberg et al. |
| 2014/0028772 | A1 | 1/2014 | Pervan |
| 2014/0199531 | A1 | 7/2014 | Pervan et al. |

* cited by examiner

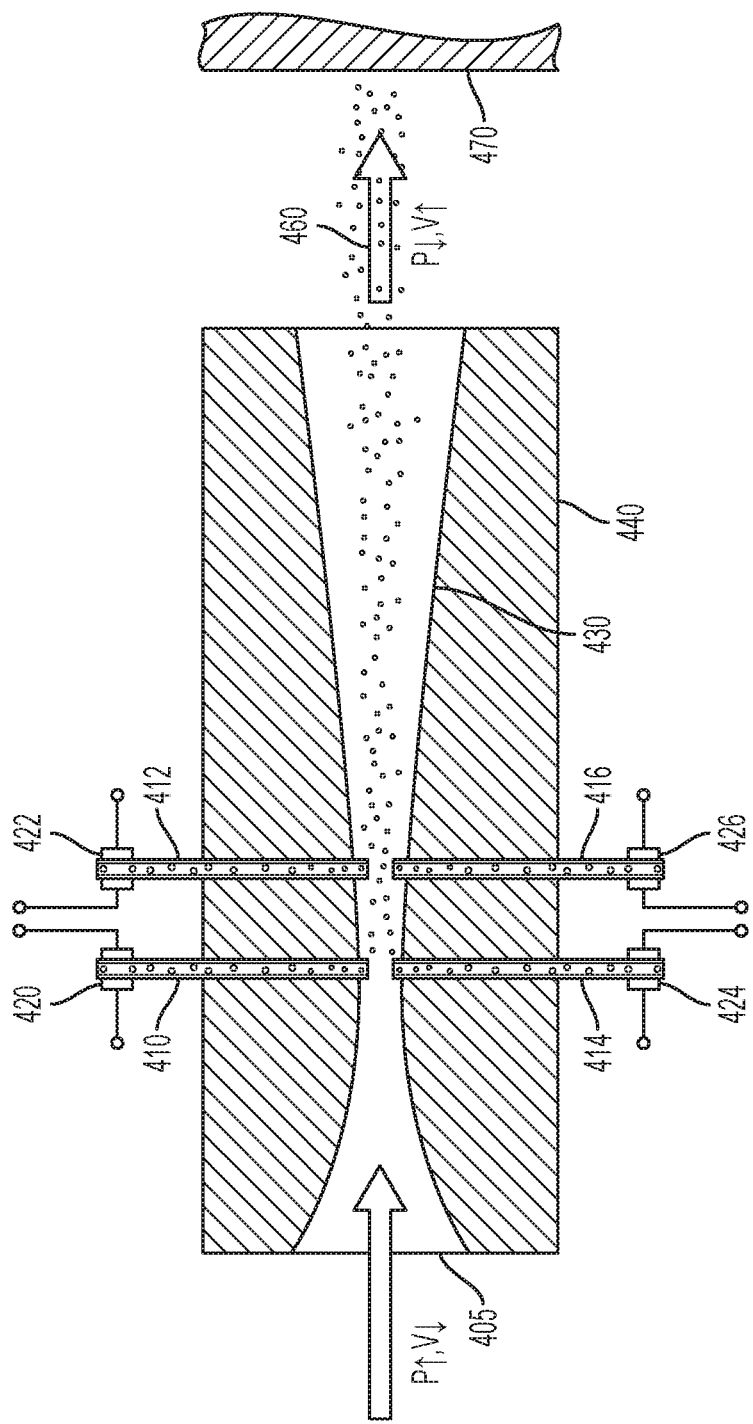

DUAL PARTICLE INKJET PRINTER

RELATED PATENT DOCUMENTS

This application is a continuation of U.S. application Ser. No. 15/850,034, filed Dec. 21, 2017, to which priority is claimed and which is incorporated herein by reference in its entirety.

TECHNICAL FIELD

The present disclosure is directed to co-located inkjets and particle delivery systems and methods related to such devices.

BACKGROUND

Inkjet printing systems may use particles in a liquid ink to give the ink various properties. Particles may be added to the liquid ink to change properties of the liquid such as color, surface texture, opacity, luminescence, and/or other properties.

SUMMARY

Embodiments described herein involve a printing apparatus comprising a liquid ejector configured to eject liquid droplets towards a medium. A particle delivery device is configured to deliver particles to the medium. The particles are configured to combine with at least some of the liquid droplets and change at least one property of the liquid droplets. The particle delivery device is configured to deliver the particles after or substantially simultaneously as the liquid droplets are ejected. A curing device is configured to cure the combination of the liquid droplets and the particles onto the medium. A controller is configured to independently control the liquid ejector and the particle delivery device.

Embodiments described herein involve a method that includes ejecting liquid droplets towards a medium. Particles are delivered to the medium at substantially a same time as or after the liquid droplets are ejected. The particles are configured to combine with least some of the liquid droplets on the medium and change at least one property of the liquid droplets. The ejection of the liquid droplets and the delivery of the particles are independently controlled. The combination of liquid droplets and the particles are cured onto the medium The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 4A illustrates a particle delivery system utilizing a propellant to eject the particles in accordance with embodiments described herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Inkjet printing systems may use solid materials in a liquid ink to give the ink various properties. The solid materials may be configured to change at least one property of the liquid. For example, the solid materials may change the color, surface texture, opacity, luminescence, and/or other properties of the liquid. Saturated colors such as white may be more easily achieved by using a high proportion of solid materials to liquid. In some cases, chemical properties of the liquid may be controlled using powder treatments, for example. Adjusting the surface ratio of solids to liquid may be useful for three dimensional solid surfaces and/or controlling the light scattering properties of surfaces. According to various embodiments, having a high ratio of particles to liquid may allow for a higher level of chemical resistance and or other types of wear resistance. Light scattering properties of the medium can also be controlled by controlling the ratio of particles to liquid.

In some cases, a large solid fraction may be difficult to jet as the viscosity becomes too large. The large solid fraction may be challenging to keep in suspension within the liquid. Having a separate solid ejection device in addition to an inkjet print head and/or other liquid ejection device may be useful for overcoming these difficulties.

Figure 1A:
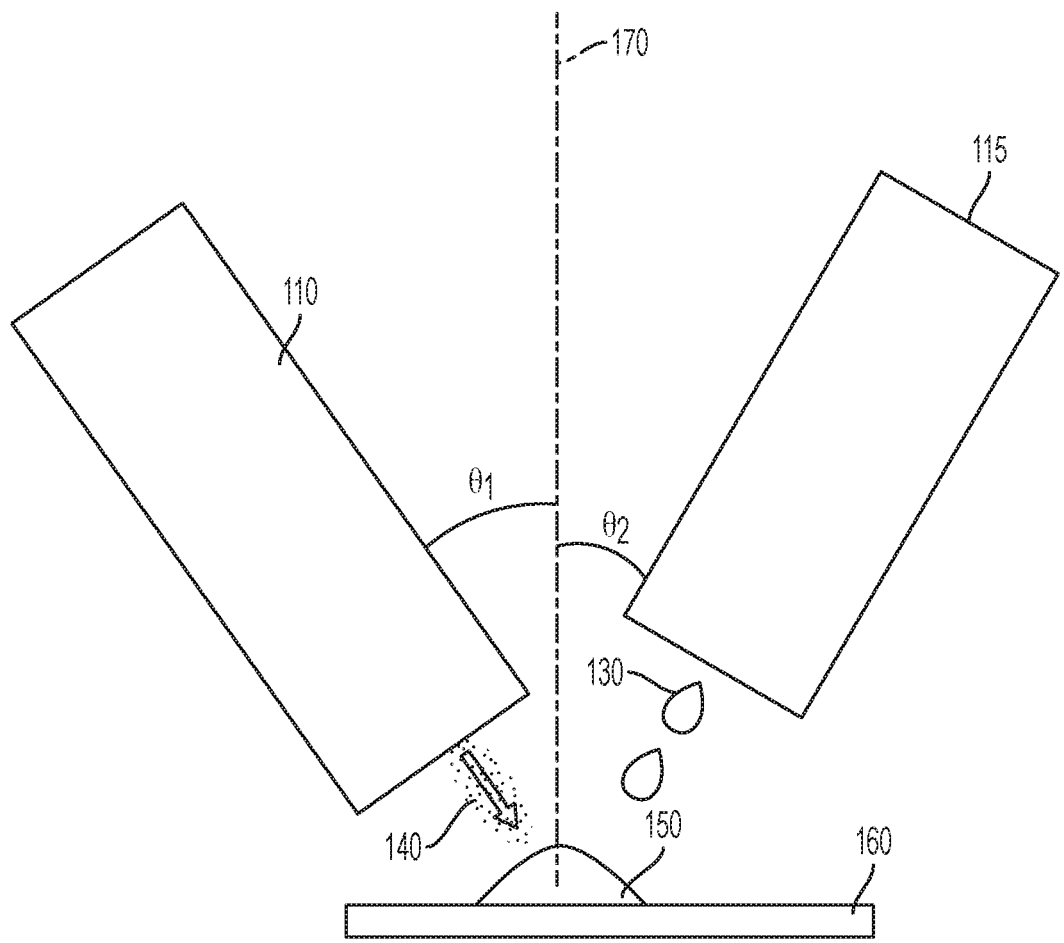
FIGS. 1A and 1B illustrate a liquid ejector and a particle delivery device in accordance with various embodiments described herein.

FIG. 1A illustrates a co-located liquid ejector 115 and a particle delivery device 110 in accordance with various embodiments described herein. In some cases, the liquid ejector 115 is configured to be an inkjet print head. The liquid ejector may be configured to eject a low viscosity fluid such as ink, an ultraviolet (UV) gel, and/or a binder. The liquid ejector 115 and the particle delivery device 110 may be configured to deliver their respective components simultaneously. In some cases, the particle delivery device 110 and the liquid ejector 115 are configured such that the liquid droplets 130 and the particles 140 arrive at a medium 160 concurrently. In some embodiments, the particle delivery device 110 is positioned after the liquid ejector 115 and isolated so that the particle delivery device 110 does not impact the liquid drop delivery. A wide variety of media may be employed for a receiving medium such as paper, plastic, foil, fabric, composite sheet film, ceramic, fabrics, and glass, for example.

According to various implementations, the liquid droplets 130 are ejected before the particles 140 and the particles are configured to coat the liquid droplets 130 on the medium 160. According to various configurations, the medium 160 is an intermediate transfer structure and the intermediate transfer structure is configured to transfer the image onto the final receiving medium.

The combination 150 of the liquid droplets 130 and the particles 140 may take various forms. For example, the combination 150 may cause a chemical reaction to occur between the liquid droplets 130 and the particles 140. In some cases, the particles 140 may be configured to reside on the surface of the liquid droplets 130. The particles 140 may be configured to facilitate a surface only transformation of the liquid droplets 130 and/or the surface of the medium 160.

According to various implementations, the particles 140 are configured to coat and/or immerse into the portions of the medium 160 that contain the liquid droplets 130 and/or not coat portions of the medium 160 that do not contain the liquid droplets 130. Excess particles may be removed after a curing process takes place. The liquid ejector 115 and/or the particle delivery device 110 may be configured to make multiple passes over the same location on the medium 160 to obtain a desired result. This may be useful for obtaining high pigment colors and/or for printing on certain types of media, for example. In some cases, the particle delivery device 110 is configured to sand blast the surface of the medium 160 to change the surface texture. In some cases, the particles 140 may be embedded in the medium 160 and then dissolved to obtain textured surfaces. One or more of the particle delivery device 110 and the liquid ejector 115 may be configured to change the temperature of the ejected material. This may be done to promote drop coverage, for example. The liquid drops may be frozen by a drop in temperature, a chemical reaction and/or by solvent removal, for example.

In order to obtain the combination of the liquid droplets and the particles, the inkjets and the particle delivery device may be configured to be at an angle relative to a longitudinal axis 170. The angle, $\theta_2$, for the liquid ejector may be in a range of roughly 0-70 degrees. The angle, $\theta_2$, for the particle delivery device may be at an angle in a range of about 0-70 degrees, for example. In configurations having more than one liquid ejector, at least one of the liquid ejectors may be at a different angle with respect to the longitudinal axis as at least one other liquid ejector. In some cases, all of the multiple liquid ejectors are disposed at substantially the same angle with respect to the longitudinal axis.

Figure 1B:
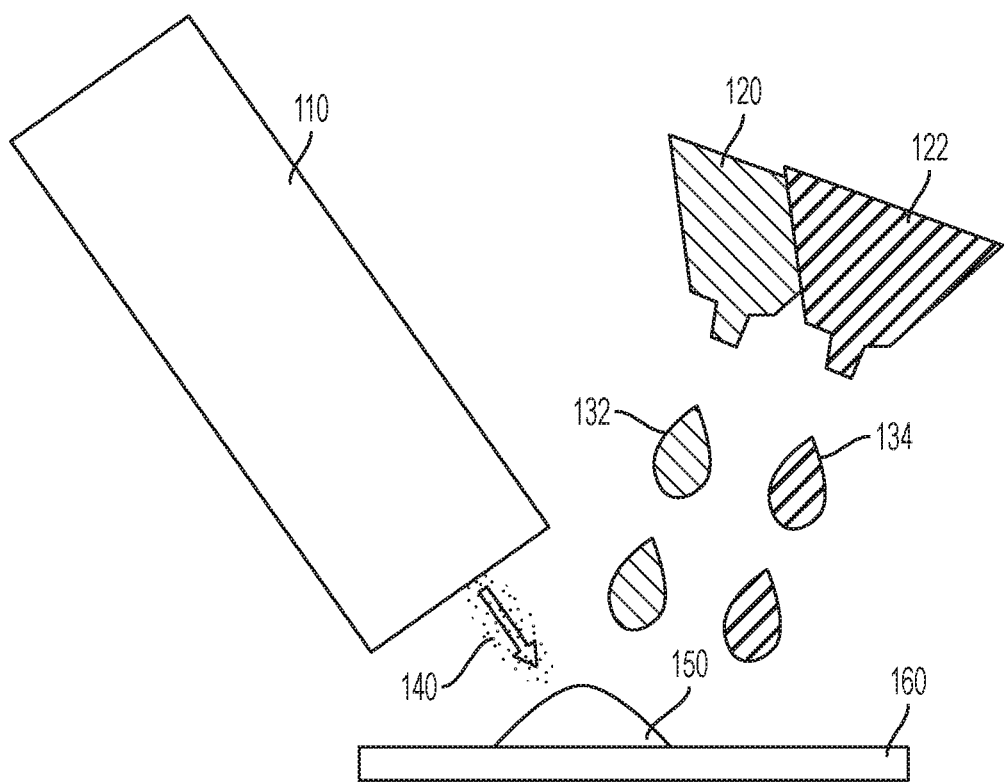

The system may have more than one liquid ejector or particle delivery device. FIG. 1B shows an example having two liquid ejectors 120, 122. In some cases, the liquid droplets 132 ejected from the first liquid ejector 120 have at least one different property from the liquid droplets 134 ejected from the second liquid ejector 122. For example, the liquid droplets 132 ejected from the first liquid ejector 120 may be a different color than the liquid droplets 134 ejected from the second liquid ejector 122. In some cases, the liquid droplets 132 ejected from the first liquid ejector 120 have the substantially the same properties as the liquid droplets 134 ejected from the second liquid ejector 122. According to various embodiments, more than one particle delivery device is used.

Figure 2:
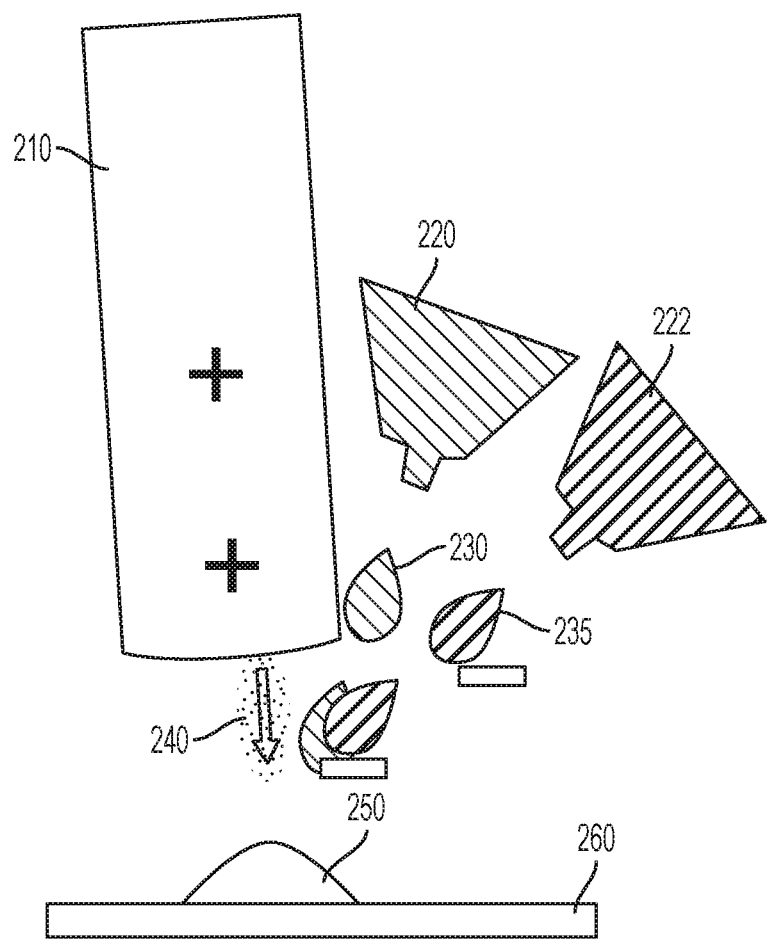
FIG. 2 illustrates an example in which the liquid droplets and the particles are configured to combine before the liquid droplets or the particles reach the medium in accordance with embodiments described herein.

The liquid droplets and the particles may be configured to combine on the medium and/or may be configured to combine in the air before the liquid droplets or the particles reach the medium. FIG. 2 illustrates an example in which the liquid droplets 230, 235 and the particles 240 are configured to combine before the liquid droplets 230, 235 or the particles reach the medium 260. The resulting combination 250 of the particles 240 and the liquid droplets 230, 235 is then transferred to the medium 260. In some cases, the combination of the particles and the liquid droplets creates a chemical reaction before the mixture reaches the medium. For example, alginate and Ca solutions or two part epoxy resins cause a change from liquid to solids.

In some cases, the particles 240 and the liquid droplets 230, 235 may be oppositely charged to promote fusion to one another. For example, the particles 240 may be positively charged before exiting the particle delivery device 210 and the liquid droplets 230, 235 may be negatively charged. A tribo-charged surface such as polytetrafluoroethylene (PTFE) may be used to charge the particles 240 and/or the liquid droplets 230, 235. While the example shown in FIG. 2 has positively charged particles 240 and negatively charged liquid droplets 230, 235, it is to be understood that the particles 240 may be negatively charged and the liquid droplets 230, 235 may be positively charged. In some cases, at least one of the particles 240 and the liquid droplets 230, 235 have no charge. In embodiments having more than one particle delivery device, liquid droplets from one of the liquid ejectors may be configured to have a charge while liquid droplets from other liquid ejectors are not charged or have a different charge. In some cases, all of the liquid droplets from the multiple liquid ejectors have the same charge.

Figure 3:
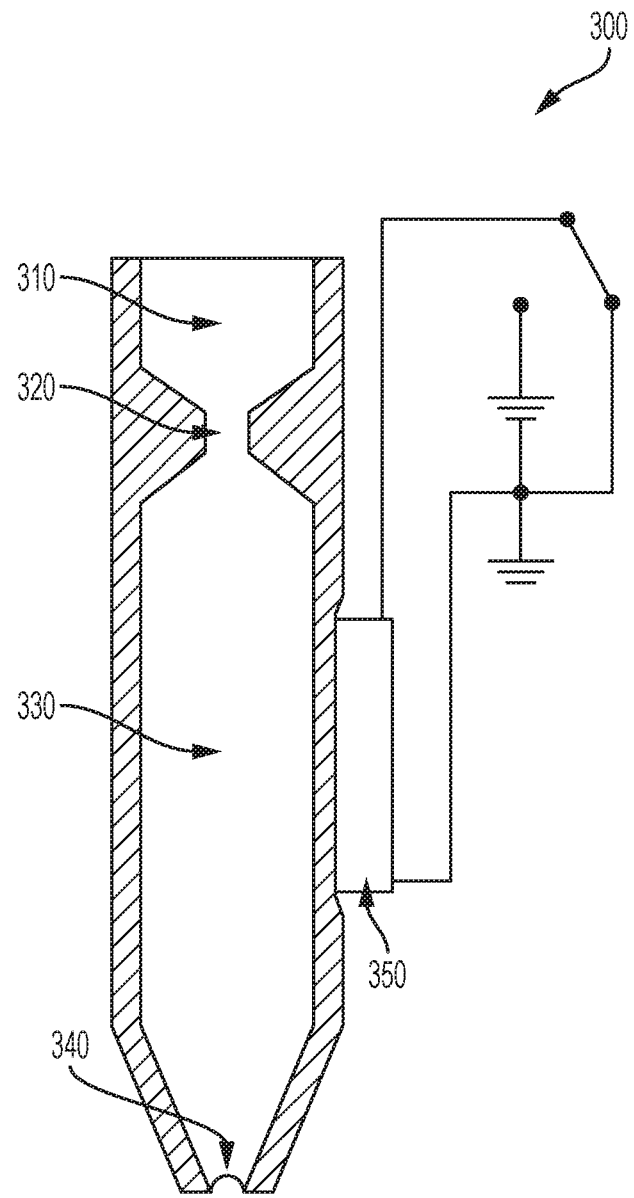
FIG. 3 illustrates a more detailed view of a liquid droplet ejection device in accordance with embodiments described herein.

FIG. 3 illustrates a more detailed view of a liquid droplet ejection device. The device includes a reservoir 310 that holds the liquid. The liquid then passes through an orifice 320 into cavity 330. Each ejector 300 includes an actuator, such as piezoelectric transducer (PZT) actuator 350, that can be electrically activated to induce a pressure wave within the ejection chamber cavity 330 and nozzle 340. The PZT actuator 350 is activated by a signal from a controller. When the ejector 300 is used for inkjet printing, the controller provides a signal that activates the PZT 350 to generate a pressure wave in the ejection chamber cavity 330 sufficient to cause ejection of an ink drop through the nozzle 340.

A particle ejector system is illustrated in FIG. 4A. The system comprises a body 440 into which is formed a Laval-type expansion pipe 430. A carrier such as air, $CO_2$, etc. is injected at a first proximal end 405 of body 440 to form a propellant stream within pipe 430. A plurality of channels 410, 412, 414, 416 are also formed in body 440. These channels 410, 412, 414, 416 are configured to deliver a material, such as a powder, into the propellant stream. Control of the introduction of material from channels 410, 412, 414, 416 is achieved, for example, by way of an electrostatic gate 420, 422. 424, 426 respectively, or other appropriate gating mechanism. As the material and propellant stream pass through pipe 430 pressure is converted into velocity, and the contributions from each of channels 410, 412, 414, 416 are mixed, such that an appropriate mixture of material exits pipe 430 at roughly 1 atm as a focused, high velocity aerosol-like jet 460, in some embodiments at or above approximately 343 m/s (supersonic). In some cases, the particles in the jet 460 impact a substrate 470 with sufficient momentum that they fuse on impact. The particle delivery system may also be a particle cloud that the drops pick up particles as they travel towards the receiving media.

While the system shown in FIG. 4A illustrates a particle ejector utilizing a propellant, it is to be understood that other types of particle ejectors may be used. For example, an electrostatic deposition technology may be used to eject the particles. An electrostatic field may be applied to charged particles causing the particles to be ejected from the device. In some cases, the particles are ejected without precision as to location. For example, the particles may be ejected over the whole or a large portion of the medium. The particles may be configured to only coat the portions of the medium that contain the liquid droplets.

Figure 4B:
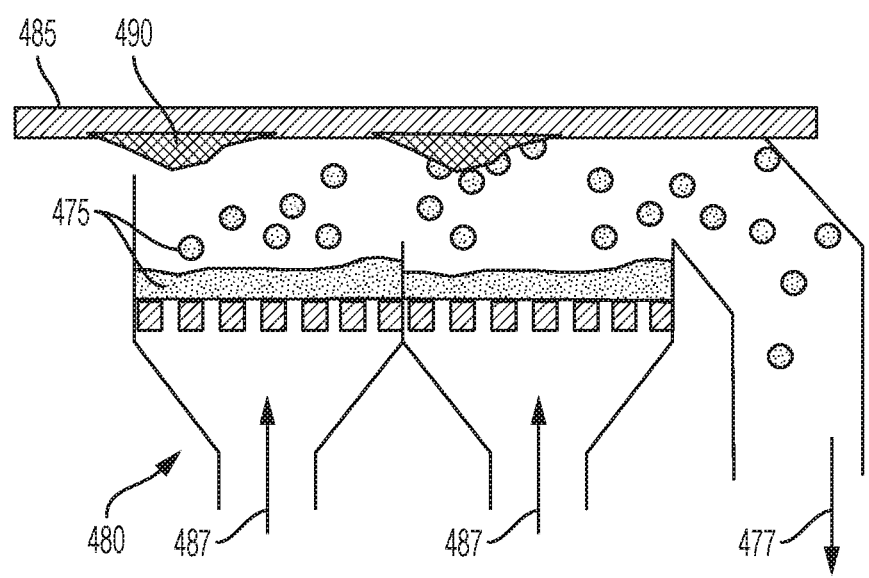
FIG. 4B illustrates a particle delivery system using a fluidized bed in accordance with embodiments described herein.

According to various embodiments described herein, a fluidized bed is used to deliver particles as shown in FIG. 4B. Creating a fluidized bed can be accomplished by adding a gas 487 to a container 480 with the particles 475. For example, a carrier gas such as nitrogen can be added to the container 480 to levitate and transport the particles 475. In some cases, the gas 487 can impart a charge to the particles 475. This can be achieved through triboelectric charging and/or electric field charging, for example. The fluidized bed is used to elevate the particles 475 and an airjet may be used to transport the elevated particles into an airstream. The particles 475 then adhere to liquid droplets 490 ejected from a liquid ejector onto a medium 485. The combination of the liquid droplets and the particles may be cured to fix the combination of liquid droplets 490 and particles 475 onto the medium 485. In some cases, an airjet is used to remove 477 excess particles before and/or after the curing process. The airjet used to transport the particles into the airstream may be the same or different than the airjet used to remove excess particles. This particle dispersment technique can be combined with inkjet or other types of liquid ejector systems.

Figure 5:
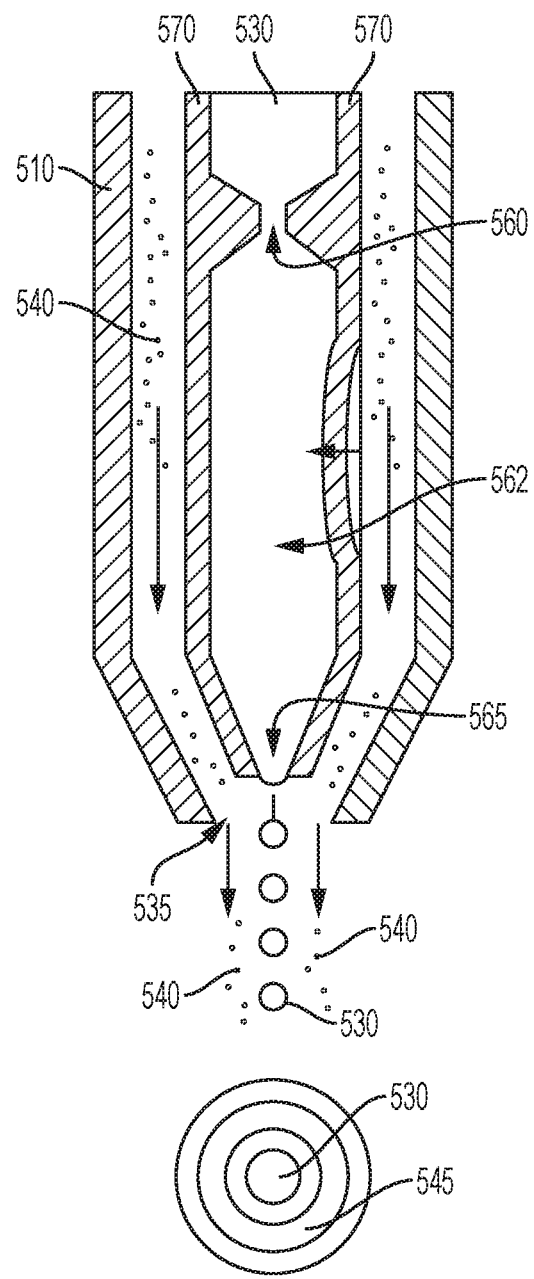
FIG. 5 illustrates an example in which the liquid ejector is disposed within a particle ejector in accordance with embodiments described herein.

According to various embodiments described herein, the liquid ejector is within the particle ejector. For example, the liquid ejector may be inside of a particle ejector such that the particles surround the liquid droplets as the droplets are ejected from the device. FIG. 5 illustrates an example in which the liquid ejector is within the particle ejector. As described above with regard to FIG. 3, the liquid ejector includes a reservoir 530 that holds the liquid. The liquid then passes through an orifice 560 into cavity 562. The liquid droplets are ejected through the nozzle 565. The liquid in the liquid ejector device is bound by walls 570.

Surrounding the liquid ejector is a particle ejector. Particles 540 are moved along the device via a propellant, for example. The particles and the propellant are disposed between the walls 570 of the liquid ejector and walls 510 of the particle ejector. The particles move along the device until exiting the device at the nozzle 535. The resulting output from the combined liquid and particle device is a combination of the liquid droplets 530 surrounded by the propellant stream 545. The particles 545 and the propellant create a laminar flow around the exit point of the nozzle 535 so the liquid droplets 530 are entrained inside the air stream. The propellant surrounding the liquid droplets may increase the precision of the droplet placement allowing more distance between the liquid ejector and the medium than in a system having only a liquid ejector.

Figure 6:
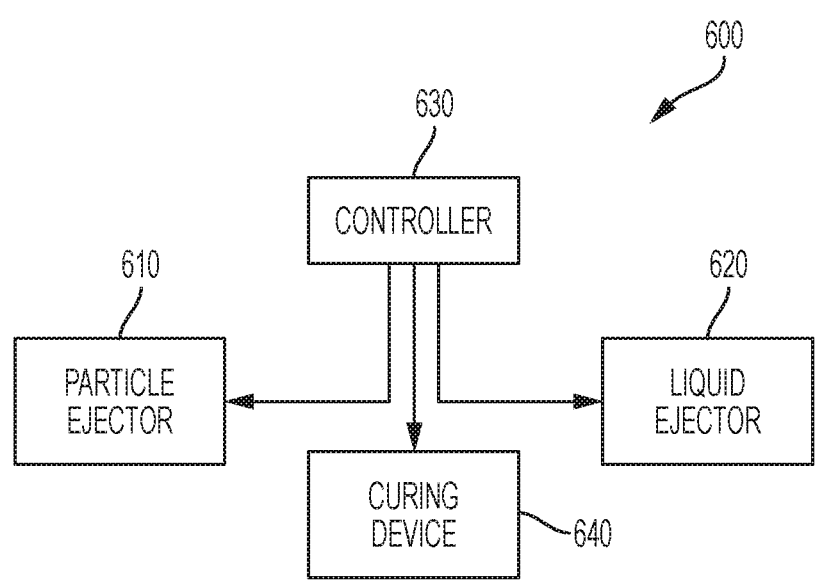
FIG. 6 illustrates a system that shows a controller that is configured to independently control the particle delivery device and the liquid ejector in accordance with embodiments described herein.

According to various embodiments, the particle delivery device and the liquid ejector are independently controlled by a controller. FIG. 6 illustrates a system 600 that shows a controller 630 that is configured to independently control the particle delivery device 610 and the liquid ejector 620. In some cases, only a portion of the liquid droplets are coated with the particles. The controller 630 can control when the delivery device 610 is activated. The controller 630 may be configured to eject a certain ratio of solid to liquid. This ratio may be capable of being changed depending on the application. The controller 630 may control the timing of the ejection of the liquid droplets and/or the particles. In some cases, the controller 630 is configured to spatially vary the ratio of the liquid droplets to the particles on a surface of the medium. This may be done to create a first portion of the medium having a first property and a second portion of the medium having a second property. For example, the first portion of the medium may have a surface texture that differs from the surface texture of the second portion of the medium. In some cases, some portions of the medium only have liquid droplets while other portions have the combined liquid and solid combination. According to various implementations, adjusting the solid ratio increases the viscosity of the mixture of solid and liquid and can help control the impact size and adhesion at the surface of the medium. The controller may also be configured to control a curing device 640 that cures the combination of liquid droplets and particles onto the medium.

Figure 7A:
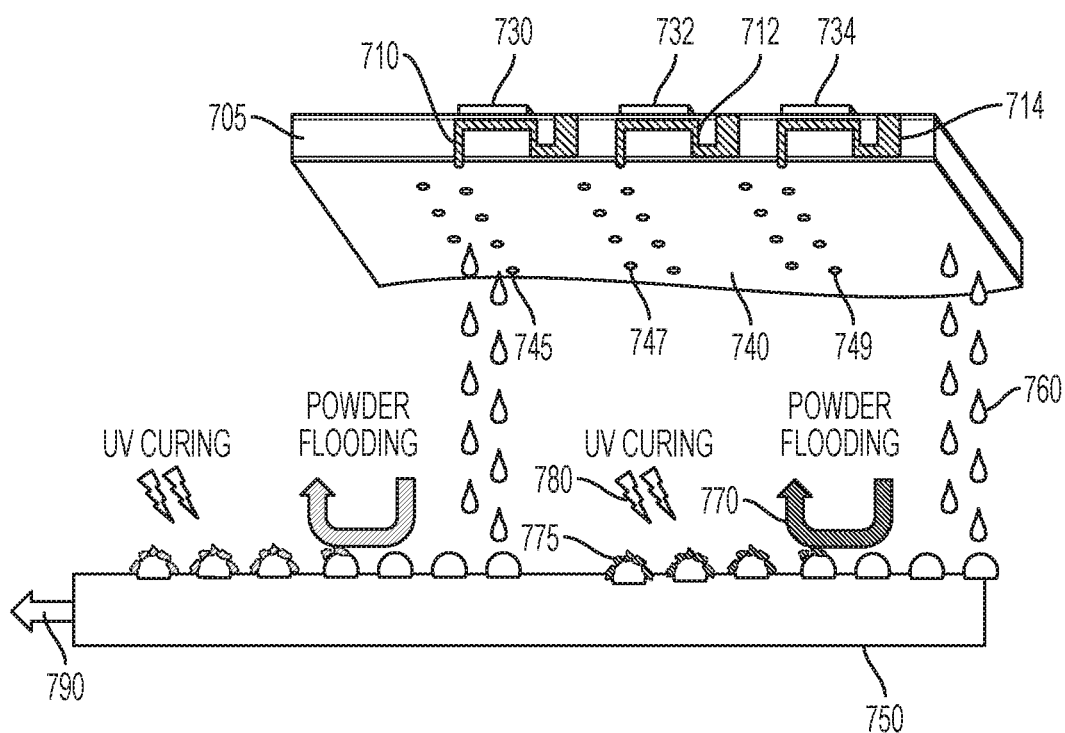
FIGS. 7A and 7B illustrate a printing systems that incorporate a liquid ejection system and a particle delivery system in accordance with embodiments described herein.

FIG. 7A illustrates a printing system that incorporates a liquid ejection system and a particle delivery system. In this example, the liquid ejector system 705 includes three separate liquid ejectors. Each liquid ejector includes an ink course 710, 712, 714, a PZT actuator 730, 732, 734 and an array of nozzles 745, 747, 749 disposed in a nozzle plate 740. Each of the separate liquid ejectors may be configured to eject liquid having a different property. For example, each liquid ejector system may be configured to eject liquid having a different color. In some cases, the separate liquid ejectors are configured to eject liquid droplets 760 at different locations on the medium 750. While the system illustrated in FIG. 7A shows three separate liquid ejectors, it is to be understood that there could be a different number of liquid ejectors. The liquid ejectors may be configured to eject low viscosity liquids such as inks, UV gels, binders, and/or any combination in high resolution patterns onto the medium 750.

Figure 7B:
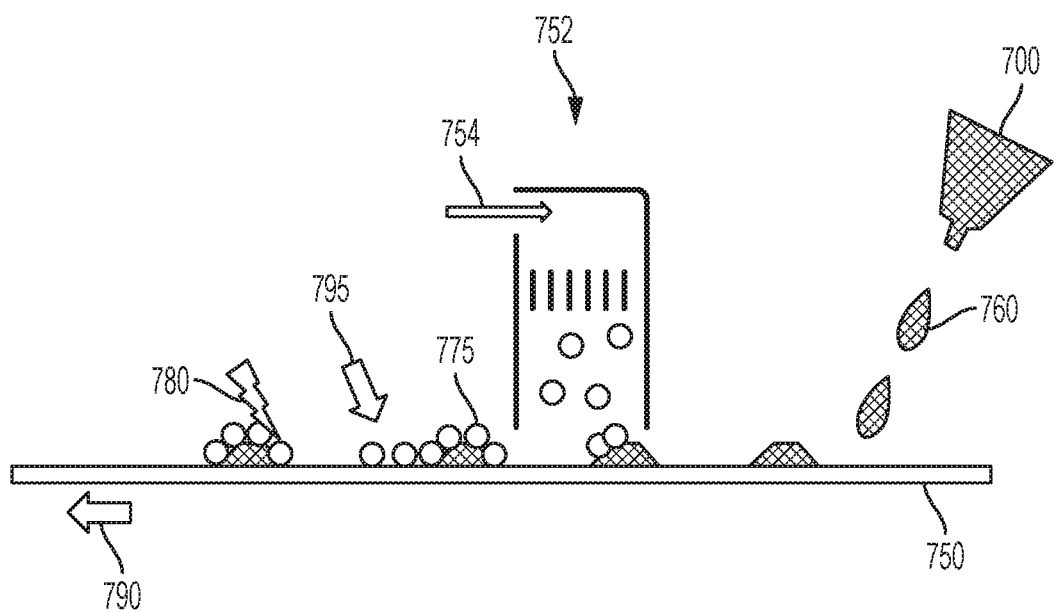

After the liquid droplets 760 are ejected onto the medium 750, a particle delivery device is configured to deliver particles 775, e.g., a powder, onto the medium 750 such that the particles 775 coat the liquid droplets 760 on the medium 750, but do not coat areas of the medium 750 that do not include liquid droplets 760. The medium 750 may be configured to move in the direction of arrow 790 as the liquid droplets 760 and/or the particles 775 are being delivered to the medium 750. In some cases, the particle delivery device uses a propellant to eject the particles 775 towards the medium 750. According to various embodiments, the particles 775 are to be delivered to the medium 750 using a fluidized bed 752 and/or an electrostatic cloud, for example. The fluidized bed 752 shown in FIG. 7B can be created by adding a gas 754 causing the particles to levitate and to combine with the liquid droplets 760 on the medium 750. In some cases, the particles 775 are delivered to the medium 750 by pouring the particles 775 onto the medium 750.

After the particles 775 have coated the liquid droplets 760 on the medium 750, the coated liquid droplets are cured to adhere the combination onto the medium 750. For example, the combination may be cured using a UV curing process such as UV cross-linking. In some cases other types of curing processes are used such as a thermal curing process, a chemical reaction curing process, and/or a phase change curing process. According to various embodiments, the curing process may involve solvent evaporation the combination of liquid droplets 760 and particles 775. The combination of liquid droplets 760 and particles 775 may be solidified through the use of UV for UV polymers, solvent evaporation in the case of aqueous inks, cooling in the case of phase change materials and/or through the use of chemical curing agents. The liquid droplets 760 may be configured to resist drying until a curing process takes place. An optional airjet 795 may be used to remove excess particles from the medium 750 before or after the curing step. It is to be understood that any combination of curing processes may be used to cure the combination of liquid droplets and particles.

Figure 8:
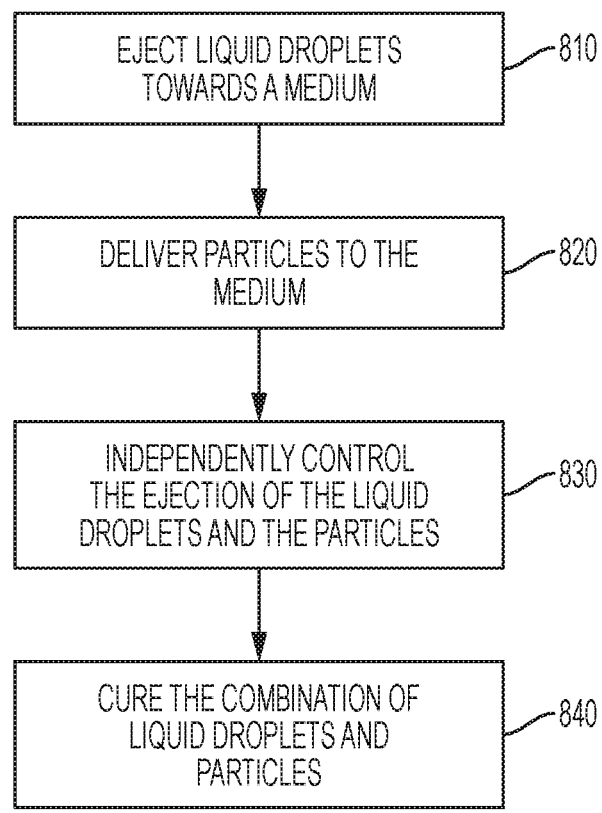
FIG. 8 illustrates a process for using a liquid ejection device with a particle delivery system in accordance with embodiments described herein.

FIG. 8 illustrates a process for using a liquid ejection device with a particle delivery device in accordance with embodiments described herein. Liquid droplets are ejected 810 towards a medium. Particles are delivered 820 to the medium at substantially a same time as or after the liquid droplets are ejected. The particles are configured to combine with at least some of the liquid droplets on the medium and change at least one property of the liquid droplets. Ejection of the liquid droplets and the delivery of the particles are independently controlled. The combination of liquid droplets and particles are cured 840 onto the medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed to embodiments can be applied individually or in any combination, not meant to be limiting but purely illustrative. It is intended that the scope be limited by the claims appended herein and not with the detailed description.

What is claimed is:

1. A printing apparatus comprising:
a liquid ejector system configured to eject liquid droplets towards a medium;
a particle delivery system configured to deliver particles to the medium, the particles configured to combine with at least some of the liquid droplets and change at least one property of the liquid droplets, the particle delivery device configured to deliver the particles after or substantially simultaneously as the liquid droplets are ejected;
a curing device configured to cure the combination of the liquid droplets and the particles onto the medium using a combination of two or more of a ultraviolet (UV) curing process, a thermal curing process, and a solvent evaporation process; and
a controller configured to independently control the liquid ejector system and the particle delivery system.

2. The apparatus of claim 1, wherein the liquid ejector system and the particle delivery system are disposed at an angle with respect to one another.

3. The apparatus of claim 1, wherein the liquid ejector system and the particle delivery system are arranged so that the particles and the ink combine before reaching the medium.

4. The apparatus of claim 1, wherein the liquid ejector system and the particle delivery system are arranged so that the particles and the ink combine on the medium.

5. The apparatus of claim 1, wherein the particles are configured to provide a surface texture to the medium.

6. The apparatus of claim 1, wherein the controller is configured to control one or more of:
a ratio of the liquid droplets to the particles; and
a timing of at least one of the ejection of the liquid droplets and the delivery of the particles.

7. The apparatus of claim 1, wherein the liquid ejector system comprises two or more liquid ejectors.

8. The apparatus of claim 1, wherein the particle delivery system comprises two or more particle delivery devices.

9. The apparatus of claim 1, wherein the particles are electrostatically charged.

10. The apparatus of claim 1, wherein the liquid ejector system is disposed within the particle delivery system.

11. The apparatus of claim 1, wherein the particle delivery system is configured to deliver the particles to the medium using a propellant.

12. The apparatus of claim 1, wherein the particle delivery system is a fluidized bed.

13. The apparatus of claim 1, wherein the particles comprise a colorant.

14. The apparatus of claim 1, wherein the controller is configured to spatially vary a ratio of the liquid droplets to the particles on a surface of the medium.

15. The apparatus of claim 1, wherein the at least one property comprises chemical resistance, wear resistance, and an amount of light scattering.

16. A method comprising:
ejecting liquid droplets towards a medium;
delivering particles to the medium at substantially a same time as or after the liquid droplets are ejected, the particles configured to combine with least some of the liquid droplets on the medium and change at least one property of the liquid droplets;
independently controlling ejection of the liquid droplets and the delivery of the particles; and
curing the combination of the liquid droplets and the particles onto the medium using a combination of two or more of a ultraviolet (UV) curing process, a thermal curing process, and a solvent evaporation process.

17. The method of claim 16, further comprising spatially adjusting the ratio of liquid droplets ejected to particles delivered.

18. The method of claim 16, further comprising controlling the timing of at least one of the ejection of the liquid droplets and the delivery of the particles.

19. The method of claim 16, further comprising electrostatically charging the particles before delivering the particles.

20. The method of claim 16, further comprising after delivering the particles to the medium, dissolving the particles to create a textured surface.

\* \* \* \* \*